United States Patent [19]

Watson et al.

[11] Patent Number: 4,939,318
[45] Date of Patent: Jul. 3, 1990

[54] DIGITIZER PEN TILT CORRECTION EMPLOYING WIRES NEAR THE DATA POINT

[75] Inventors: James S. Watson; Dana Doubrava, both of Phoenix, Ariz.

[73] Assignee: Calcomp Inc., Anaheim, Calif.

[21] Appl. No.: 431,886

[22] Filed: Nov. 6, 1989

[51] Int. Cl.⁵ .............................................. G08C 21/00
[52] U.S. Cl. ...................................................... 178/19
[58] Field of Search .................................... 178/18, 19

[56] References Cited

U.S. PATENT DOCUMENTS 3,873,770  3/1975  Ioannou .................................. 178/18
4,568,799  2/1986  Kobayashi et al. ................ 178/19 X Primary Examiner—Stafford D. Schreyer
Attorney, Agent, or Firm—Donald A. Streck; Wm F. Porter, Jr.

[57] ABSTRACT

In a digitizer tablet system employing a tablet having equally spaced parallel grid wires disposed in a plane along an axis parallel to the tablet's upper surface and a pen cursor having a sensing coil disposed concentric with and perpendicular to a longitudinal axis of the pen cursor to develop a characteristic output waveform from electromagnetic inductance between the grid wires and the sensing coil, this invention is the method of compensating a calculation of the position of the pen's tip on the tablet's upper surface and along the axis determined from an interpolation of the characteristic output waveform to find its zero voltage crossing point for tilt of the pen cursor longitudinal axis from perpendicular to the tablet's upper surface comprising using voltage values from grid wires next on opposite sides of the zero crossing point to calculate a pen tilt compensation factor.

2 Claims, 2 Drawing Sheets

DIGITIZER PEN TILT CORRECTION EMPLOYING WIRES NEAR THE DATA POINT

BACKGROUND OF THE INVENTION

This invention relates to digitizing tablet systems for inputting data to a computer and, more particularly, in a digitizer tablet system employing a tablet having equally spaced parallel grid wires disposed in a plane along an axis parallel to the tablet's upper surface and a pen cursor having a sensing coil disposed concentric with and perpendicular to a longitudinal axis of the pen cursor to develop a characteristic output waveform from electromagnetic inductance between the grid wires and the sensing coil, the method of compensating a calculation of the position of the pen's tip on the tablet's upper surface and along the axis determined from an interpolation of the characteristic output waveform to find its zero voltage crossing point for tilt of the pen cursor longitudinal axis from perpendicular to the tablet's upper surface comprising using voltage values from grid wires next on opposite sides of the zero crossing point to calculate a pen tilt compensation factor.

Digitizing tablet systems are becoming increasingly popular as a way to input positional information to a computer program on a dynamic basis. Traditionally, the major drawbacks to general acceptance of digitizing tablet systems (as opposed to the popular "mouse") have been size and price. A typical prior art "small" digitizing tablet is about eighteen inches square and retails in the $500 range. Thus, for the average personal computer (PC) user, the tablet takes up too much room on the desk and costs more than can be justified for the convenience that a tablet system offers.

The assignee of this application is about to change all that. Soon, they will introduce a new smaller and less costly digitizing tablet system under the trademark WIZ which if fully intended to be a "mouse substitute". For the same average PC user, the WIZ tablet system will take up approximately the same room on the desk as a mouse and cost so little more than a mouse that the user will no longer be able to justify doing without the convenience and benefits that a tablet system offers.

As those skilled in the art know, a digitizing tablet system typically comes with one or both of two cursor devices—a "pen" and a "puck". The user simply plugs the cursor device of choice into the tablet and plugs the tablet into the computer at an I/O port to begin using the device for input. While various methods of sensing the position of the tip of the pen or crosshairs on the puck are employed in the art, the most popular (and that employed in the digitizing apparatus of the assignee hereof) is an electromagnetic induction system. The cursor device is provided with a sensing coil of wire adjacent to the sensing point. The tablet is provided with a grid of orthogonal wires over a rectangular active area. One can apply an electrical signal to the wires of the tablet and sense it in the coil of the cursor device or vice versa. The latter approach (i.e. applying the signal to the coil and sensing it in the grid) is the preferred method of operation for the assignee's apparatus.

One of the objects of the WIZ project was the making of a smaller tablet to be used in many cases as a selector for a plurality of menu selections as contained on a pre-printed overlay held in a pre-established position over the acitve area of the tablet. A user can select a particular menu selection for the currently operating program in the computer by simply placing the cursor device (i.e. the pen tip or the crosshairs at the center of the sensing coil in the puck) over the desired menu selection location on the tablet's surface as indicated by the menu overlay and then pushing a button on the cursor device to inform the computer that location has been selected. The sensing coil in the puck is fairly large and is moved over the surface of the tablet parallel thereto. Accordingly, there is no problem with tipping of the sensing coil with attendant error in its positional detection. Such is not the case with the pen, however. As depicted in FIG. 1, the pen 10 also has a sensing coil 12 disposed in its tip end 14. To allow for tapering of the pen 10 from a body portion 16 diameter to a pointing tip 18, the sensing coil 12 must be moved up into the body portion 16 from the tip 18. To fit into the pen body portion 16 at all, the sensing coil 12 must be substantially smaller than its counterpart in the puck. The sensing coil 12 in the pen 10 is located concentrically about and perpendicular to the longitudinal axis 20 of the pen 10. Thus, if the pen 10 were moved so as to be perpendicular to the surface 22 of the tablet 24, there would be no problem. Most users hold and move a pen type cursor device in the manner of a standard writing pen or pencil; that is, it is held in the fingers with the tip 18 at an acute angle to the tablet surface 22. As illustrated in FIG. 1, this angular orientation (or "pen tilt") causes the electrical center 26 of the coil 12 to be shifted from the contact point of the tip 18 in the direction of the tilt by an amount $\Delta P$. If one is selecting an area on the tablet 24 which is a square inch in area and places the pen tip 18 in about the center of the area, pen tilt will typically be of little consequence. If one is trying to select accurately at selected points, however, pen tilt can have a substantial effect on the actual location "selected". Because of its smaller size, the WIZ tablet and the selection blocks on the menu overlays tend to be smaller as well so that positioning of the pen tip 18 and the effects of pen tilt must be considered from a product acceptance and reliability point of view. That is, when a user "selects" a menu entry by placing the pen tip 18 wihthin the boundaries of that entry on the overlay, he/she expects that menu entry to be the one which is, in fact, selected to the computer and not the one adjacent thereto because the pen 10 was tilted over the boundary line.

The problem of pen tilt in digitizers is not new and methods for correcting it are known in the art. All have problems and drawbacks which make them unsuitable for inclusion in the assignee's smaller-sized WIZ system in particular. The apparatus of Ioannou (U.S. Pat. No. 3,873,770) looks at and compares the peaks of the waveforms from the gridwires on opposite sides of the location of the pen's electrical center to determine pen tilt. This is basically a good approach; however, it fails to work adjacent the edges of the active area as there are no peaks available because they would appear in grid wires outside of the active area. Again, because of the small size of the assignee's WIZ tablet and the need to be able to use the entire active area accurately, a system which does not work adjacent the edges is unacceptable.

Nakamura et al. (U.S. Pat. No. 4,477,877) works in a similar fashion employing many wires and waveform peaks and, therefore, is unacceptable for the present application for the same reasons as Ioannou.

Kobayashi et al. (U.S. Pat. No. 4,568,799) claims to solve the pen tilt problem by employing a sensing coil which is at "a predetermined position which is not close to the tip of the pen."

Kobayashi (U.S. Pat. No. 4,717,793) again claims to solve the pen tilt problem by a system in which "The false signals caused by a tipped stylus cancel each other during such mixing."

Blesser (U.S. Pat. No. 4,577,057) corrects for pen tilt by employing a second sensing coil displaced longitudinal back from the primary sensing coil at the tip. The two signals produced therefrom provide sufficient data to determine pen tilt.

All these latter approaches would require that the assignee hereof change the way in which the products thereof sense the position of cursor devices. Since this is a patented and proprietary method which affords the assignee what it considers to be a superior product, changing to another method of sensing so as to use the patented approach of others for detecting pen tilt is not even to be considered.

Wherefore, it is an object of this invention to provide a simple and reliable method of detecting pen tilt in a digitizing tablet system employing electromagnetic detection techniques.

It is another object of this invention to provide a method of detecting pen tilt in a digitizing tablet system employing electromagnetic detection techniques which is fully effective up to the edges of the tablet's active area.

It is yet another object of this invention to provide a method of detecting pen tilt in a digitizing tablet system employing electromagnetic detection techniques which does not require changing the physical construction of the pen or tablet.

It is still another object of this invention to provide a method of detecting pen tilt in a digitizing tablet system employing electromagnetic detection techniques which does not require changing the basic method of operation of the pen and tablet.

Other objects and benefits of this invention will become apparent from the detailed description which follows hereinafter when taken in conjunction with the drawing figures which accompany it.

SUMMARY

The foregoing objects have been achieved in a digitizer tablet system employing a tablet having equally spaced parallel grid wires disposed in a plane along an axis parallel to the tablet's upper surface and a pen cursor having a sensing coil disposed concentric with and perpendicular to a longitudinal axis of the pen cursor to develop a characteristic output waveform from electromagnetic inductance between the grid wires and the sensing coil, the method of compensating a calculation of the position of the pen's tip on the tablet's upper surface and along the axis determined from an interpolation of the characteristic output waveform to find its zero voltage crossing point for tilt of the pen cursor longitudinal axis from perpendicular to the tablet's upper surface comprising the steps of, using voltage values from two grid wires next on opposite sides of the zero crossing point to calculate the position of the zero crossing point along the axis by interpolation; determining a value "r" which is the fraction of the distance between the two grid wires of the zero crossing point; using voltage values from a grid wire B next adjacent the zero crossing point on one side and a grid wire A next following B on the one side as well as voltage values from a grid wire C next adjacent the zero crossing point opposite the one side and a grid wire D next following C, determining values for $\Delta P$ and $\Delta N$ according to the following formulas $\Delta P=(1-r)A+rB$ and $\Delta N=(1-r)C+rD$; using the values of $\Delta P$ and $\Delta N$ to calculate $$T = \frac{\Delta P - \Delta N}{\Delta P + \Delta N}$$

where the result "T" is a number roughly proportional to the pen tilt; and, adding a pre-established constant times T to the original "r" value in calculations of the pen tip position as a tilt correction.

In an alternate approach, the "T" is obtained by passing a straight line through the $\Delta P$ and $\Delta N$ points on straight line segments of interpolation; determining where the straight line passes through the zero voltage line; using the difference between the point where the straight line passes through the zero voltage line and the original "r" value as a compensating number "T" roughly proportional to the pen tilt; and, adding a pre-established constant times T to the original "r" value in calculations of the pen tip position as a tilt correction.

DESCRIPTION OF THE PREFERRED EMBODIMENT

Figure 1:
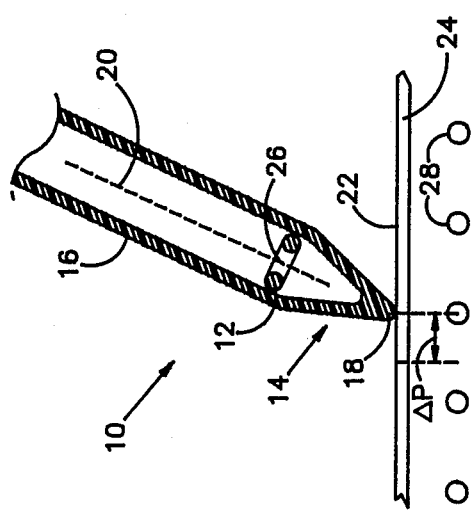
FIG. 1 is an enlarged cutaway simplified drawing of the tip portion of a pen type cursor for use with a digitizing tablet as wherein the present invention is applicable and illustrating the problem of pen tilt compensated for thereby.

Unlike the scanners that are used in facsimile machines and the like where there is detecting resolution of the scanning apparatus itself of say 300 dots (i.e. sensing points) per inch, the wires 28 of the tablet 24 comprising the horizontal and vertical grid wires that are used to sense the location of the sensing coil 12 in the pen 10 are disposed in spaced relationship to one another and the actual "zero crossing" of the signal from one side of the actual location of the pen to the other side (the "data point") is calculated by an interpolation method. Between the actual wires of the grid (in each direction, i.e. X and Y) there is a change in voltage ($\Delta V$). As mentioned earlier, where a full waveform and the peaks thereof is employed to determine pen tilt (as a function of the offset between the peaks), numerous wires 28 must be available before the peak is located and, therefore, the technique is not useful adjacent the edges of the active area 30. In the pen tilt method of the present invention which will be described in detail hereinafter, only analysis of the ΔVs close adjacent the pen's position is conducted in order to determine pen tilt. As a result of using only wires 28 about 0.5 inches from the data point, the correctable portion of the active areas 30 extends to within about 0.5 inches of the last wire 28 at the edge of the active area 30.

Figure 2:
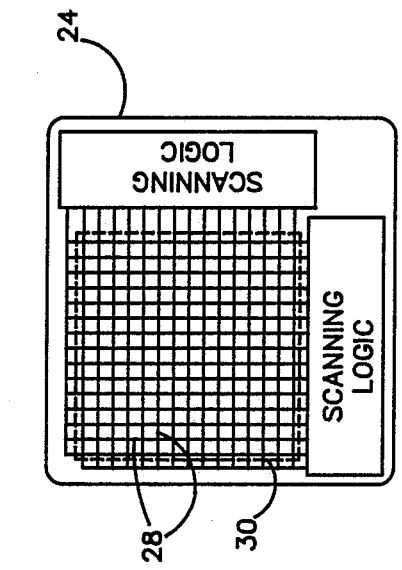
FIG. 2 is a simplified cutaway drawing of a digitizing tablet as wherein the present invention is applicable and illustrating the spaced horizontal and vertical wires of the sensing grid thereof.

The present invention is based on the findings of extensive analysis of waveforms produced in a digitizing tablet system of the assignee hereof employing traditional prior art pen tilt techniques as mentioned above wherein the plus and minus peaks of the characteristic waveform (located several wires out from the data point) are employed. While it had long been assumed in the art that the peaks of the waveform were required to perform a meaningful correction for pen tilt, the applicants herein found that, in fact, the ΔVs between the wire closest to the data point and the wires on each side thereof change in a consistent and useful manner which can be employed to compensate for pen tilt. This useful phenomenon is depicted in three cases (i.e. pen tilted left, pen vertical, and pen tilted right) in the drawings of FIGS. 2-4. In the drawings, the characteristic curve of the field is shown along with the voltages on the three wires (seen as circles in the drawings) near the data point. From a review of the drawing figures, it can be seen that the ΔVs between the wires (ΔP and ΔN for positive and negative, respectively) varies and that the difference between ΔP and ΔN exhibits a monotonic relationship to pen tilt.

Figure 3:
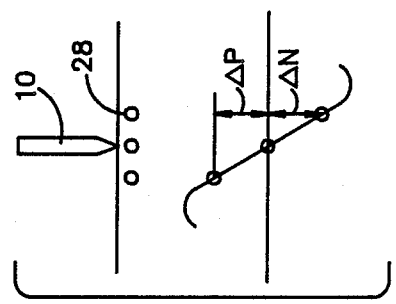
FIGS. 3–5 are simplified overlay drawings showing the change in the waveform at wires adjacent the gridwire closest to the zero crossing point as a result of pen tilt as employed in the compensation method of the present invention.
Figure 4:
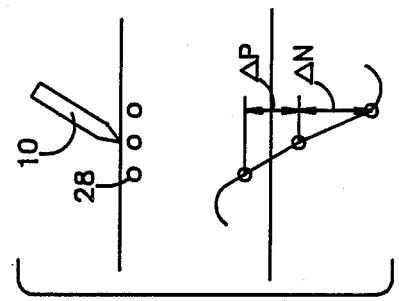
Figure 5:
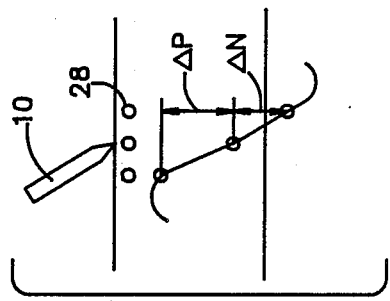
Figure 6:
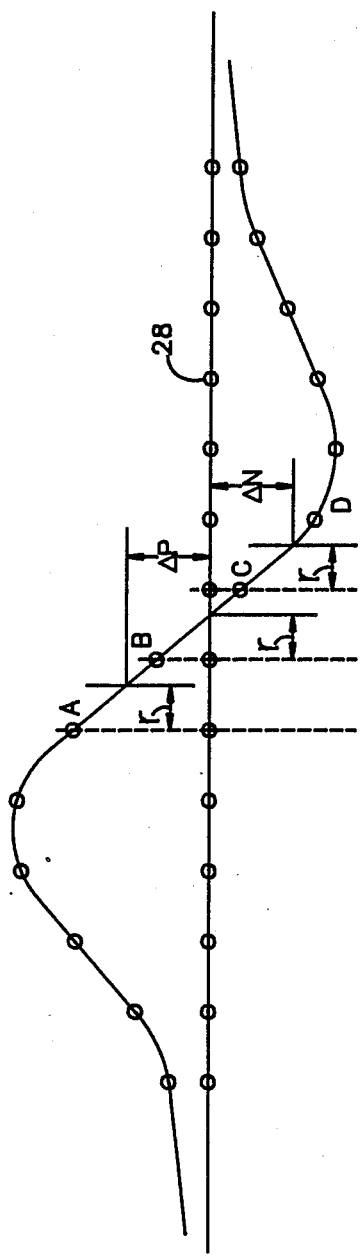
FIG. 6 is an enlarged drawing of the characteristic waveform resulting in an electromagnetic sensing digitizing tablet and pen system with the pen tilted and the parameters employed in the pen tilt compensation method of the present invention shown in detail.

The drawings of FIGS. 3-5 represent the ideal case where the pen tip is located directly above one of the wires. As can be appreciated, that is the exceptional case and, more typically, the data point or zero crossing point must be found by interpolation as mentioned earlier herein. Thus, the goal of the correction algorithm employed in the method of the present invention is to determine the ΔP and ΔN voltages relative to the zero crossing point. This can best be explained and understood with respect to the drawing of FIG. 6 which depicts a tilted configuration. After the associated voltages for the data points as depicted and labeled in the drawing figure are obtained, the tilt correction is accomplished as follows:

1. Using the two wires on opposite sides of the zero crossing point, calculate the zero crossing point by interpolation. The resulting value "r" is the fraction of the distacne between the wires of the zero crossing point.

2. For a distance of one wire spacing on either side of the calculated zero crossing point, using other data points to find interpolated values for ΔP and ΔN according to the following formulas:

$$\Delta P = (1-r)A + rB; \text{ and,}$$

$$\Delta N = (1-r)C + rD$$

3. Perform the calculation for:

$$T = \frac{\Delta P - \Delta N}{\Delta P + \Delta N}$$

where the result "T" is a number roughly proportional to the pen tilt.

4. Add an appropriate pre-established constant times T to the original "r" value as a tilt correction.

Figure 7:
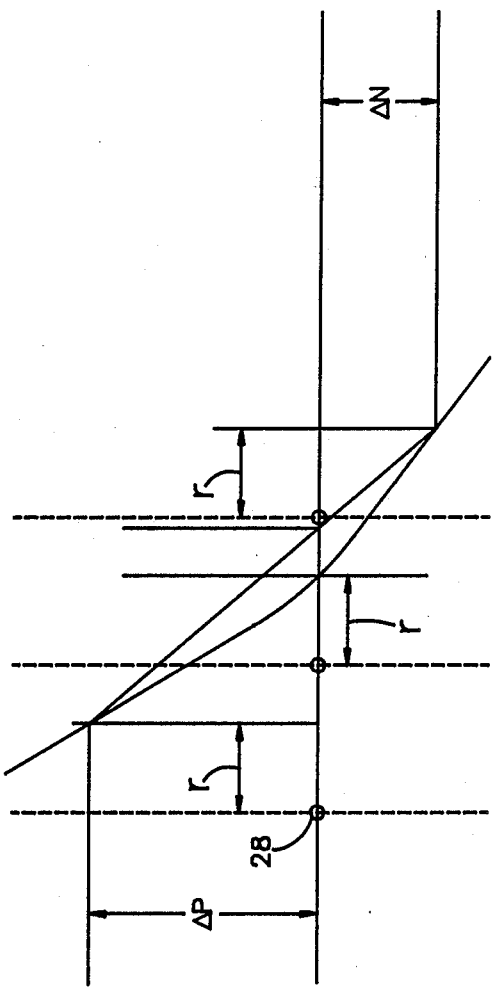
FIG. 7 is a greatly enlarged drawing of the characteristic waveform resulting in an electromagnetic sensing digitizing tablet and pen system with the pen tilted illustrating an alternate approach to determining a pen tilt compensation factor according to the method of the present invention.

An alternate approach to step 3 above is depicted in FIG. 7. In this approach, one determines where a straight line passing through the ΔP and ΔN points on the straight line segments of interpolation passes through the zero voltage line. The difference between this point and the original "r" value is also roughly proportional to the tilt.

Note that the determination made by the method of the present invention is a very close approximation; but is not intended to be an ultra-precision correction. What is offered by the present invention is a correction for pen tilt which provides an acceptable level of tilt correction virtually all the way to the edge of the active area of the tablet. An important aspect as stated in the objective is that is does not require modification of the hardware of the tablet and its pen cursor. Over the prior art, it sacrifices a small degree of accuracy relative to pen tilt compensation for more useful correctable area on the tablet and direct use within the hardware in its present form.

Wherefore, having thus described our invention, what is claimed is:

1. In a digitizer tablet system employing a tablet having equally spaced parallel grid wires disposed in a plane along an axis parallel to the tablet's upper surface and a pen cursor having a sensing coil disposed concentric with and perpendicular to a longitudinal axis of the pen cursor to develop a characteristic output waveform from electromagnetic inductance between the grid wires and the sensing coil, the method of compensating a calculation of the position of the pen's tip on the tablet's upper surface and along the axis determined from an interpolation of the characteristic output waveform to find its zero voltage crossing point for tilt of the pen cursor longitudinal axis from perpendicular to the tablet's upper surface comprising the steps of:

(a) using voltage values from two grid wires next on opposite sides of the zero crossing point to calculate the position of the zero crossing point along the axis by interpolation;

(b) determining a value "r" which is the fraction of the distance between the two grid wires of the zero crossing point;

(c) using voltage values from a grid wire B next adjacent the zero crossing point on one side and a grid wire A next following B on the one side as well as voltage values from a grid wire C next adjacent the zero crossing point opposite the one side and a grid wire D next following C, determining values for ΔP and ΔN according to the following formulas ΔP=(1−r)A+rB and ΔN=(1−r)C+rD;

(d) using the values of ΔP and ΔN from step (c) to calculate $$T = \frac{\Delta P - \Delta N}{\Delta P + \Delta N}$$

where the result "T" is a number roughly proportional to the pen tilt; and, (d) adding a pre-established constant time T to the original "r" value in calculations of the pen tip position as a tilt correction.

2. In a digitizer tablet system employing a tablet having equally spaced parallel grid wires disposed in a plane along an axis parallel to the tablet's upper surface and a pen cursor having a sensing coil disposed concentric with and perpendicular to a longitudinal axis of the pen cursor to develop a chracteristic output waveform from electromagnetic inductance between the grid wires and the sensing coil, the method of compensating a calculation of the position of the pen's tip on the tablet's upper surface and along the axis determined from an interpolation of the characteristic output waveform to find its zero voltage crossing point for tilt of the pen cursor longitudinal axis from perpendicular to the tablet's upper surface comprising the steps of:

(a) using voltage values from two grid wires next on opposite sides of the zero crossing point to calculate the position of the zero crossing point along the axis by interpolation;

(b) determining a value "r" which is the fraction of the distance between the two grid wires of the zero crossing point;

(c) using voltage values from a grid wire B next adjacent the zero crossing point on one side and a grid wire A next following B on the one side as well as voltage values from a grid wire C next adjacent the zero crossing point opposite the one side and a grid wire D next following C, determining values for $\Delta P$ and $\Delta N$ according to the following formulas $\Delta P = (1-r)A + rB$ and $\Delta N = (1-r)C + rD$;

(d) using the values of $\Delta P$ and $\Delta N$ from step (c), passing a straight line through the $\Delta P$ and $\Delta N$ points on straight line segments of interpolation;

(e) determining where the straight line passes through the zero voltage line;

(f) using the difference between the point where the straight line passes through the zero voltage line and the original "r" value as a compensating number "T" roughly proportional to the pen tilt; and, (g) adding a pre-established constant times T to the original "r" value in calculations of the pen tip position as a tilt correction.

* * * * *